(12) United States Patent
Chappaz

(10) Patent No.: US 8,095,077 B2
(45) Date of Patent: Jan. 10, 2012

(54) SIGNAL POWER ESTIMATION

(75) Inventor: David F. Chappaz, Milton (GB)

(73) Assignee: Cambridge Silicon Radio Limited, Cambridge (GB)

(*) Notice: Subject to any disclaimer, the term of this patent is extended or adjusted under 35 U.S.C. 154(b) by 521 days.

(21) Appl. No.: 12/366,035

(22) Filed: Feb. 5, 2009

(65) Prior Publication Data
US 2010/0197260 A1 Aug. 5, 2010

(51) Int. Cl.
H04B 17/00 (2006.01)

(52) U.S. Cl. .............. 455/67.13; 375/144; 375/150

(58) Field of Classification Search ............ 455/67.13; 375/144, 150
See application file for complete search history.

(56) References Cited

U.S. PATENT DOCUMENTS

| 7,031,679 B2* | 4/2006 | Persson et al. ............... 455/137 |
| 7,421,009 B2* | 9/2008 | Kawamoto et al. ........... 375/144 |
| 7,995,641 B2* | 8/2011 | Bottomley et al. ........... 375/150 |

* cited by examiner

Primary Examiner — Kenneth B. Wells
(74) Attorney, Agent, or Firm — Fitzpatrick, Cella, Harper & Scinto

(57) ABSTRACT

Two versions of the auto-covariance matrix of a received signal are obtained. One version is dependent upon the fraction of the power of a transmission site that goes into the wanted signals and a value is sought for this fraction that produces a good match between the two versions.

9 Claims, 3 Drawing Sheets

SIGNAL POWER ESTIMATION

The invention relates to the field of wireless communications. More specifically, the invention relates to the estimation of the fraction of the power that is attributable to a wanted signal, as opposed to extraneous signals, within a received signal acquired by a receiver from a plurality of transmission sources.

In a receiver, it is useful to have a measure of the fraction of the power that is attributable to a wanted signal, as opposed to extraneous signals, within a received signal from a plurality of transmission sources. For example, this information can be used in an algorithm for determining the tap coefficients of an equaliser.

According to one aspect, the invention provides a method of evaluating the fraction of the power that is attributable to a wanted signal, as opposed to extraneous signals, within a received signal acquired by a receiver from a plurality of transmission sources. This method comprises populating a first version of an auto-covariance matrix of the received signal with entries obtained by way of calculating products of samples of the received signal with complex-conjugated samples of the received signal and finding a value of that fraction that causes a second version of the received signal's auto-covariance matrix to be a good match to said first version. That second version is a weighted sum of (i) an auto-covariance matrix of the wanted signal, populated on the basis of channel impulse response estimate terms for a composite channel through which the wanted signal can be said to be received from said sources, and (ii) a plurality of auto-covariance matrices, each relating to extraneous signals emitted by a respective one of the sources and each populated on the basis of channel impulse response estimate terms for the channel linking its respective source with the receiver. At least some of the weights in the sum are functions of said fraction.

Thus, the invention provides a method for evaluating the fraction of the power that is attributable to a wanted signal, as opposed to extraneous signals, within a received signal acquired by receiver from a plurality of transmission sources.

In certain embodiments, the received signal is one that has been transmitted using closed loop transmit diversity.

In certain embodiments, a good match between the two versions of the auto-covariance matrix is obtained by minimising a cost function with respect to the power fraction in question. This can for example be done approximately by providing a finite set of values for the fraction and choosing the value from the set that give the best value to the cost function.

The invention also extends to apparatus that is configured to perform the method according to the invention.

Moreover, the invention extends to programme code which when run on suitable data processing hardware causes that hardware to perform a method according to the invention. The programme code may be stored in a suitable means such as a hard drive, a read only memory or other volatile or non-volatile storage.

By way of example only, certain embodiments of the invention will now be described with reference to the accompanying drawings, in which.

Figure 1:
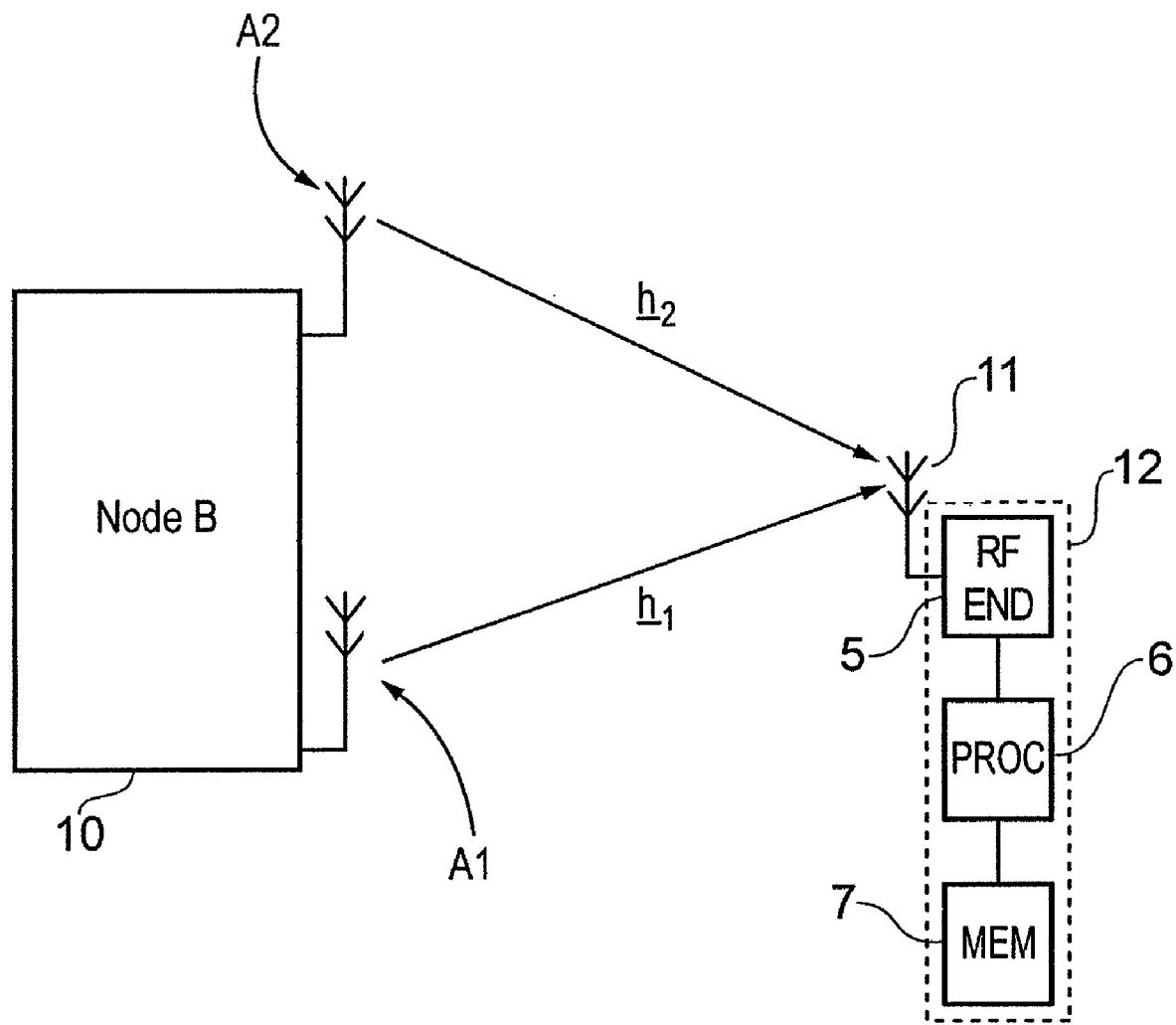
FIG. 1 is a block diagram schematically illustrating a node B communicating with a UE using closed loop transmit diversity.

FIG. 1 shows a base station (a node B) 10 communicating with a UE 12 (in this case a handset). The node B 10 communicates with the UE 12 using the closed loop transmit diversity (CLTD) scheme set out in the 3GPP standards. The UE 12 receives the signals from the node B 10 through channels $h_1$ and $h_2$. These channels also carry to the UE 12 signals outputted by the node B 10 that are destined for users other than the UE 12. These "unwanted" (from the perspective of the UE 12) signals may be CLTD or space time transmit diversity (STTD) formatted or may even have no transmit diversity. Where transmit diversity is available, a network operating a node B will typically aim to use CLTD with a UE but will fall back to STTD where conditions are unfavourable. (An example of unfavourable conditions would be where the UE is moving rapidly. In the case of FIG. 1, rapid movement would imply rapid change in the channels $h_1$ and $h_2$.) CLTD mode aims to adjust a phasor $\psi$ to maximise the signal to noise ratio of the wanted signal within the signals arriving at the UE 12 from antennae A1 and A2. Clearly if the channels from A1 and A2 to the UE 12 are changing rapidly then it may become burdensome or impossible to update $\psi$ with sufficient speed. $\psi$ is updated by the node B 10 using reports from the UE 12. $\psi$ can take 1 of 4 allowed states. Thus, the phase alignment sought through $\psi$ adjustment is achieved coarsely.

FIG. 1 also provides a high level overview of the internal structure of the UE 12. The signals from the node B 10 are acquired at an antenna 11. An RF front end section 5 converts the signal supplied by the antenna 11 into a digital baseband signal which is then processed by a data processor 6, typically to recover the information payload in the signals sent out from antennae A1 and A2. The processor 6 achieves this by performing instructions stored within an associated memory 7.

The node B 10 outputs a certain amount of signal power at a given time. This varies as users initiate calls, terminate calls, move in or out of the cell served by the node B, etc. The fraction of this power that goes into the wanted signals (i.e. those that the UE is trying to receive via CLTD mode) is $\rho$ and the fraction of this power in the aforementioned unwanted signals is $1-\rho$. $\rho$ is for example a parameter used in an algorithm for calculating tap coefficients for an equaliser operating on the signal acquired through the UE's antenna. Therefore, the UE 12 needs to estimate $\rho$ from time to time.

Figure 2:
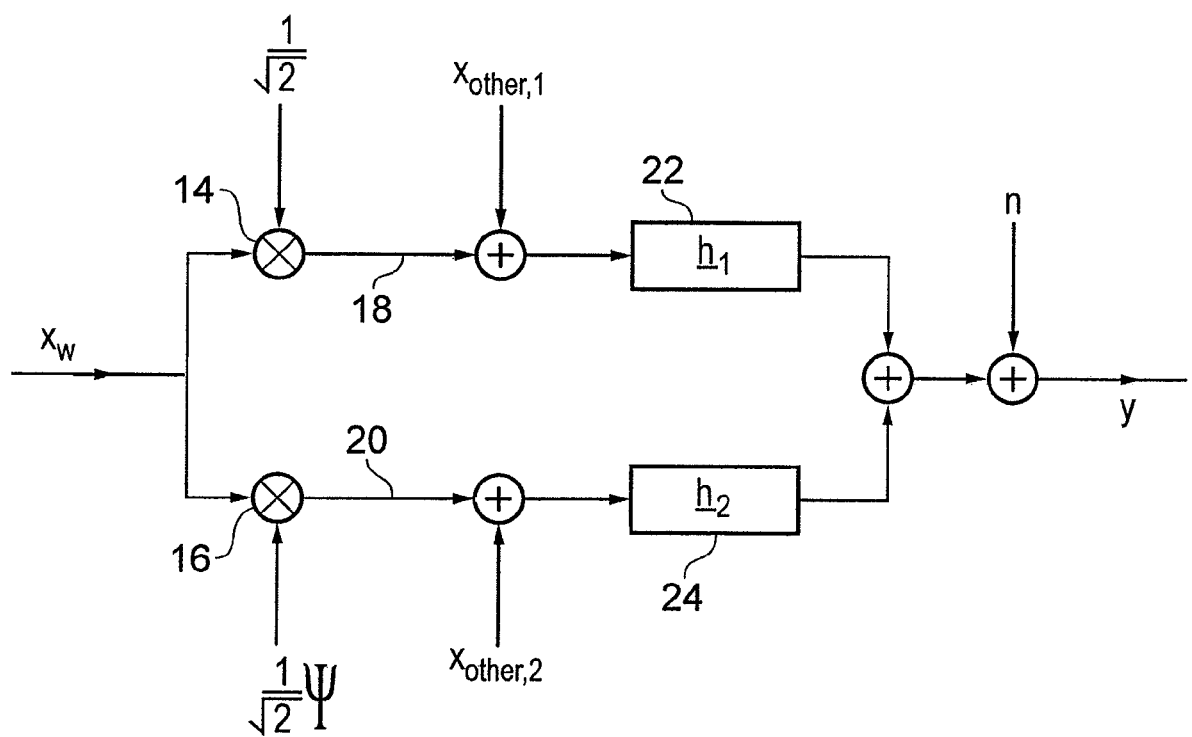
FIG. 2 is a mathematical model of the transmissions from the node B of FIG. 1 to the UE where extraneous signals are also taken into account.

FIG. 2 shows a mathematical model of the FIG. 1 system. $x_w$ is a wanted signal to be sent from the node B 10 to the UE 12 using CLTD. $x_w$ is fed into two multipliers 14 and 16 in parallel. Upper limb 18 represents the route to the UE 12 via antenna A1 and lower limb 20 represents the route to UE 12 via antenna A2. $\psi$ is the phasor controlling phase alignment of wanted signal components transmitted to the UE through $h_1$ and $h_2$. The pair of $1/\sqrt{2}$ factors indicate that the wanted signal power is shared equally between the transmissions of the wanted signal via antennae A1 and A2. $x_{other,1}$ is the "other signals" that come out of antenna A1, i.e. the unwanted signals coming out of antenna A1 and yet arriving at the UE 12 via $h_1$. $x_{other,2}$ is the unwanted signals arriving from antenna A2 at the UE 12. The parameter "n" indicates noise in the system (e.g., thermal noise introduced by the receiver itself, or interfering signals from other Node Bs) and "y" is the signal received at the UE 12 that is to undergo equalisation. Filters 22 and 24 are FIR filters implementing channel impulse responses $h_1$ and $h_2$ respectively (of course, in other embodiments different types of filter could be used, such as IIR filters).

Figure 3:
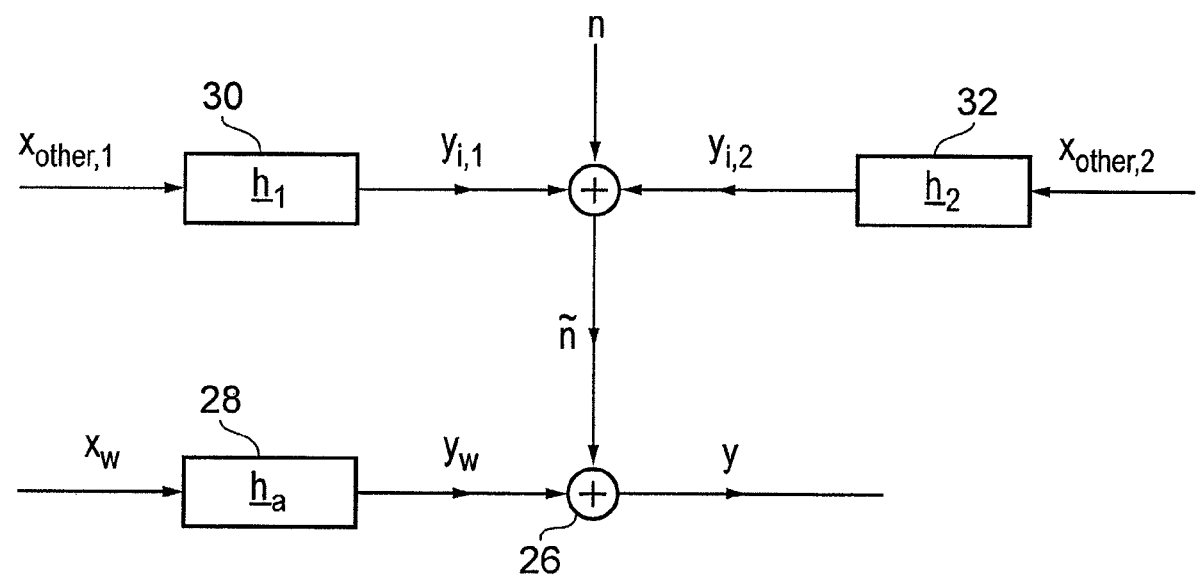
FIG. 3 is a rearrangement of the mathematical model of FIG. 2.

FIG. 3 is a rearrangement of the FIG. 2 model. The signal coming into the side of the main-path adder 26 can be regarded as a "coloured" noise signal, ñ. Also, the filter 28 in the main path implements the channel impulse response $$\underline{h}_a = \frac{1}{\sqrt{2}} \cdot \{\underline{h}_1 + \psi \underline{h}_2\}$$

which is the equivalent composite channel impulse response that the Closed Loop encoded signal $x_w$ seems to have been transmitted through (from the UE perspective).

Since the emissions from antennae A1 and A2 contain wanted ($x_w$) and unwanted ($x_{other,1}$ and $x_{other,2}$) parts, the signal y contains wanted ($y_w$) and unwanted or interfering ($y_i$) parts.

Mathematically:

$$y = y_w + y_i$$

In terms of FIG. 3, $y_w$ is the signal emerging from filter 28 and $y_i$ is the signal ñ. Ignoring n, $y_i$ can be decomposed into:

$$y_i = y_{i,1} + y_{i,2}$$

where $y_{i,1}$ is the signal emerging from the filter 30 with impulse response $\underline{h}_1$ in FIG. 3 and $y_{i,2}$ is the signal from the filter 32 with impulse response $\underline{h}_2$.

It is known that the auto-covariance matrix of a signal z (with a statistical mean of zero—as is always the case in digital communications) is defined as:

$$R_{ZZ} = \begin{bmatrix} R(0) & R(1) & R(2) & R(3) & \ldots \\ R(-1) & R(0) & R(1) & R(2) & \ldots \\ R(-2) & R(-1) & R(0) & R(1) & \ldots \\ R(-3) & R(-2) & R(-1) & R(0) & \ldots \\ \vdots & \vdots & \vdots & \vdots & \ddots \end{bmatrix}$$

where $R(k) = E[z_n \cdot z^*_{n-k}]$ is the auto-correlation function of the signal z at lag k.

also, $R(-k) = R(k)^*$ is a property.

It is also worth noting that R(0) (appearing on the main diagonal of the auto-covariance matrix) is by definition $\sigma_z^2$ (the signal variance or power).

It is also known that the auto-covariance matrix can be constructed from channel impulse response (CIR) data, as will be discussed later. In the meantime, however, it should be noted that it is possible to calculate $R_{yy}$ simply from arriving chips of signal y by putting z→y in the above matrix. This version of the auto-covariance matrix shall be referred to as $R_{yy}^{SIG}$. Now it will be discussed how $R_{yy}$ from can be obtained from CIR information.

When a channel estimate is available for a channel, say $\underline{h} = [h_0 \ h_1 \ h_2 \ \ldots \ h_{L-1}]$, through which symbols s have been transmitted and a signal z has arrived, the received signal auto-correlation function at lag k, $R(k) = E[z_n \cdot z^*_{n-k}]$, can be constructed in known fashion based on the channel impulse response h (and assuming that the transmitted symbol stream is a white random process) thus:

$$R(k) = \sigma_s^2 \cdot \sum_{i=k}^{L-1} h_i \cdot h^*_{i-k}$$

where $\sigma_s^2$ denotes the variance (the power) of the transmitted symbol stream.

Therefore, if $\sigma_s^2$ is assumed to be known, another way to construct the auto-covariance matrix of a signal z is:

$$R_{ZZ} = \begin{bmatrix} R(0) & R(1) & R(2) & R(3) & \ldots \\ R(-1) & R(0) & R(1) & R(2) & \ldots \\ R(-2) & R(-1) & R(0) & R(1) & \ldots \\ R(-3) & R(-2) & R(-1) & R(0) & \ldots \\ \vdots & \vdots & \vdots & \vdots & \ddots \end{bmatrix}$$

where R(k) is $$R(k) = \sigma_s^2 \cdot \sum_{i=k}^{L-1} h_i \cdot h^*_{i-k}$$

and depends both on the channel impulse response h and on the transmitted power $\sigma_s^2$. This version of the auto-covariance matrix will be referred to as $R_{zz}^{CIR}$ since it is derived from CIR information.

In practice however, $\sigma_s^2$ is usually not known, therefore it is convenient to define the normalised auto-correlation function:

$$\tilde{R}(k) = \frac{1}{\sigma_s^2} \cdot R(k)$$

This can easily be evaluated as it only depends on the channel impulse response $\underline{h}$:

$$\tilde{R}(k) = \sum_{i=k}^{L-1} h_i \cdot h^*_{i-k}$$

Also, a normalised version of the auto-covariance matrix of a received signal z can be constructed as:

$$\tilde{R}_{ZZ} = \begin{bmatrix} \tilde{R}(0) & \tilde{R}(1) & \tilde{R}(2) & \tilde{R}(3) & \ldots \\ \tilde{R}(-1) & \tilde{R}(0) & \tilde{R}(1) & \tilde{R}(2) & \ldots \\ \tilde{R}(-2) & \tilde{R}(-1) & \tilde{R}(0) & \tilde{R}(1) & \ldots \\ \tilde{R}(-3) & \tilde{R}(-2) & \tilde{R}(-1) & \tilde{R}(0) & \ldots \\ \vdots & \vdots & \vdots & \vdots & \ddots \end{bmatrix}$$

This version of the normalised auto-covariance matrix will be referred to as $\tilde{R}_{zz}^{CIR}$ since it is derived from CIR information.

Note that the normalised and non-normalised versions are linked: $R_{zz} = \sigma_s^2 \cdot \tilde{R}_{zz}$ The auto-covariance matrix for y is $R_{yy}$; for $y_w$ it is $R_{y_w y_w}$ and for $y_i$ it is $R_{y_i y_i}$. So, because $y = y_w + y_i$, $R_{yy}$ can be represented as:

$$R_{yy} = R_{y_w y_w} + R_{y_i y_i}$$

Here, a contribution to $R_{yy}$ from the "cross product" $R_{y_i y_w}$ has been assumed to be zero, which means that the wanted and interfering components have been assumed to be uncorrelated.

For ease of reference, $R_{y_w y_w}$ shall henceforth be called "$R_w$" and $R_{y_i y_i}$ shall be called "$R_i$." Also, $R_{y_{i,1} y_{i,1}}$ shall be called "$R_{i,1}$" and $R_{y_{i,2} y_{i,2}}$ shall be called "$R_{i,2}$"

For the same reason as above, because $y_i = y_{i,1} + Y_{i,2}$: $R_i = R_{i,1} + R_{i,2}$. As a consequence: $R_{yy} = R_w + R_{i,1} + R_{i,2}$ which can also be written as: $R_{yy} = \sigma_w^2 \cdot \tilde{R}_w + \sigma_{i,1}^2 \cdot \tilde{R}_{i,1} + \sigma_{i,2}^2 \cdot \tilde{R}_{i,2}$ where $\sigma_w^2$ is the power of the wanted transmitted signal ($x_w$)

$\sigma_{i,1}^2$ is the power of the unwanted transmitted signals from antenna 1 ($X_{other,1}$)

$\sigma_{i,2}^2$ is the power of the unwanted transmitted signals from antenna 2 ($x_{other,2}$)

Let $\sigma^2$ be the total transmitted power by the node B: $\sigma^2 = \sigma_w^2 + \sigma_{i,1}^2 + \sigma_{i,2}^2$ Assuming equal power is transmitted from both antennas (whether or not diversity is used, the network operators are likely to balance the power on all antennas), then: $\sigma_{i,1}^2 = \sigma_{i,2}^2$ Since $\rho$ is the fraction of the total power allocated to the wanted signal we have: $\sigma_w^2 = \rho \cdot \sigma^2$ and as a result:

$$\sigma_{i,1}^2 = \sigma_{i,2}^2 = \frac{1-\rho}{2} \cdot \sigma^2$$

Therefore: $R_{yy} = \sigma^2 \cdot \left[ \rho \cdot \tilde{R}_w + \frac{1-\rho}{2} \cdot (\tilde{R}_{i,1} + \tilde{R}_{i,2}) \right]$ In the construction of the above equation for $R_{yy}$, $\tilde{R}_w$ has been scaled by the fraction of power allocated to the wanted signal and $\tilde{R}_{i,1}$, $\tilde{R}_{i,2}$ have been scaled by the fraction of power allocated to the unwanted signals. Furthermore the linear combination of $\tilde{R}_w$ and $\tilde{R}_{i,1}$, $\tilde{R}_{i,2}$ has been scaled by $\sigma^2$, which is the total transmitted power by the node B. This is because $\tilde{R}_i$ and $\tilde{R}_{i,1}$, $\tilde{R}_{i,2}$ just reflect channel characteristics and not the power of the signals traversing those channels and those power weightings need to be taken into account when constructing $R_{yy}$.

Although $\sigma^2$ is actually unknown, it can be thought of as a function of $\rho$ and chosen so that the entries on the main diagonal of $R_{yy}$ are all equal to $\sigma_y^2$, as expected:

$$\sigma^2(\rho) = \frac{\sigma_y^2}{\rho \cdot \tilde{R}_w(0) + \frac{1-\rho}{2} \cdot (\tilde{R}_{i,1}(0) + \tilde{R}_{i,2}(0))}$$

For the avoidance of doubt, it is confirmed that $\tilde{R}_w(0)$ denotes the normalised auto-correlation of w at lag 0, it can also be thought of as any element with coordinates (n,n) in the auto-covariance matrix of $y_w$ (i.e. on the main diagonal). The convention applies of course to $\tilde{R}_{i,1}(0)$ and $\tilde{R}_{i,2}(0)$ also. The quantity $\sigma_y^2$ is $\sigma_z^2$ with $z \to y$ and can be measured by the UE 12.

The UE 12 has the capacity to estimate $h_1$ and $h_2$ (hence to derive $h_a$) using known techniques so $\tilde{R}_w^{CIR}$ can be obtained by $z \to \bar{y}_w$ and $h \to h_a$ in $\tilde{R}_{zz}^{CIR}$. In the same way, $\tilde{R}_{i,1}^{CIR}$ can be obtained by putting $z \to x_{other,1}$ and $h \to h_1$ in $\tilde{R}_{zz}^{CIR}$ and $\tilde{R}_{i,2}^{CIR}$ can be obtained by putting $z \to x_{other,2}$ and $h \to h_2$ in $\tilde{R}_{zz}^{CIR}$.

So, $$R_{yy}^{CIR} \approx \sigma^2(\rho) \cdot \left[ \rho \cdot \tilde{R}_w^{CIR} + \frac{1-\rho}{2} \cdot (\tilde{R}_{i,1}^{CIR} + \tilde{R}_{i,2}^{CIR}) \right]$$

So, $R_{yy}^{CIR}$ is a function of $\rho$.

$R_{yy}^{CIR}$ should match $R_{yy}^{SIG}$, so the following cost function can be minimised with respect to the parameter $\rho$:

$$\xi = \|R_{yy}^{CIR}(\rho) - R_{yy}^{SIG}\|$$

The double straight brackets indicate a matrix norm operation of the kind:

$$\|A - B\| = \sum_{i,j} |a_{i,j} - b_{i,j}|^2$$

Here, A and B are matrices having respective sets of entries $a_{ij}$ and $b_{ij}$.

The value of $\rho$ that minimises $\xi$ provides the value of $\rho$ at the present time for use in calculating the equaliser coefficients. In other words, the value of $\rho$ that makes $R_{yy}^{CIR}$ best model the current reality. It will of course be apparent to the skilled person that other suitable cost functions exist and could be used here, and an alternative will now be described.

As discussed above, $R_{yy}^{CIR}$ and $R_{yy}^{SIG}$ are autocorrelation matrices. An auto-covariance matrix (in this case of size 3 by 3) will have the following structure:

$$\begin{bmatrix} f_{0,0} & f_{0,1} & f_{0,2} \\ f_{0,1}^* & f_{0,0} & f_{0,1} \\ f_{0,2}^* & f_{0,1}^* & f_{0,0} \end{bmatrix}$$

In general terms, an auto-covariance matrix will have a main diagonal running from top left to bottom right consisting of $f_{0,0}$ entries, with an "upper triangle" of entries above that diagonal and a "lower triangle" of entries below that diagonal. Moreover, it will be appreciated that the lower triangle is a mirror image (about the aforementioned diagonal) of the upper triangle, with added conjugation of the entries.

Therefore, for this particular type of matrix, the matrix norm $\|A-B\|$ can be decomposed into:

$$\|A - B\| = N|a_0 - b_0|^2 + (N-1)|a_1 - b_1|^2 + (N-1)|a_1^* - b_1^*|^2 + (N-2)|a_2 - b_2|^2 +$$
$$(N-2)|a_2^* - b_2^*|^2 + \ldots + 1|a_{N-1}^* - b_{N-1}^*|^2 + 1|a_{N-1} - b_{N-1}|^2$$

where N is the number rows (and columns) of matrices A and B.

Since $|a_i - b_i|^2 = |a_i^* - b_i^*|^2$, we can re-express the matrix norm as:

$$\|A-B\| = N|a_0 - b_0|^2 + 2(N-1)|a_1 - b_1|^2 + 2(N-2)|a_2|^2 + \ldots + 2|a_{N-1} - b_{N-1}|^2$$

It is preferable to use this more compact form of the matrix norm to evaluate the cost function $\xi$ as it is clearly much quicker to calculate. Sometimes, this more compact form of the matrix norm is referred to as a type of vector norm since in its calculation only the terms from the vectors that are the uppermost rows of matrices A and B are employed. Generally speaking, there are various ways of defining a matrix norm and it will be apparent that for each there is a corresponding compact form of calculation.

Within the UE 12, the cost function optimisation and the subsequent deduction of a value for $\rho$ is achieved by the performance by processor 6 of a dedicated sequence of instructions from memory 7. It will of course be apparent to the skilled person that the algorithm for deducing ρ could be carried out using a different hardware structure within the UE 12. For example, the UE 12 could contain an application specific integrated circuit (ASIC) designed to evaluate ρ. Other hardware structures for implementing the algorithm for the deduction of ρ will of course be apparent to the skilled person.

The invention claimed is:

1. A method of evaluating the fraction of the power that is attributable to a wanted signal, as opposed to extraneous signals, within a received signal acquired by a receiver from a plurality of transmission sources, the method comprising:
   a. populating a first version of an auto-covariance matrix of the received signal with entries obtained by way of calculating products of samples of the received signal with complex-conjugated samples of the received signal; and
   b. finding a value of said fraction that causes a second version of the received signal's auto-covariance matrix to be a good match to said first version;
wherein:
   c. said second version is a weighted sum of:
      i) an auto-covariance matrix of the wanted signal, populated on the basis of channel impulse response estimate terms for a composite channel through which the wanted signal can be said to be received from said sources, and
      ii) a plurality of auto-covariance matrices, each relating to extraneous signals emitted by a respective one of said sources and each populated on the basis of channel impulse response estimate terms for the channel linking its respective source with the receiver; and
   d. at least some of the weights in the sum are functions of said fraction.

2. A method according to claim 1, wherein the wanted signal is transmitted using closed loop transmit diversity.

3. A method according to claim 1, wherein cost function optimisation is used to determine a good match between the second and first versions of the received signal's auto-covariance matrix.

4. A method according to claim 1, wherein the cost function used in said optimisation is the norm of the difference between two vectors, one being a row of said first version and the other being the equivalent row of said second version.

5. Apparatus for evaluating the fraction of the power that is attributable to a wanted signal, as opposed to extraneous signals, within a received signal acquired by a receiver from a plurality of transmission sources, the apparatus comprising a processor and a memory containing instructions to be carried out by the processor, wherein the processor is arranged to:
   a. populate a first version of an auto-covariance matrix of the received signal with entries obtained by way of calculating products of samples of the received signal with complex-conjugated samples of the received signal; and
   b. find a value of said fraction that causes a second version of the received signal's auto-covariance matrix to be a good match to said first version; wherein:
   c. said second version is a weighted sum of:
      i) an auto-covariance matrix of the wanted signal, populated on the basis of channel impulse response estimate terms for a composite channel through which the wanted signal can be said to be received from said sources, and
      ii) a plurality of auto-covariance matrices, each relating to extraneous signals emitted by a respective one of said sources and each populated on the basis of channel impulse response estimate terms for the channel linking its respective source with the receiver; and
at least some of the weights in the sum are functions of said fraction.

6. Apparatus according to claim 5, wherein the wanted signal is transmitted using closed loop transmit diversity.

7. Apparatus according to claim 6, wherein the processor is arranged to use cost function optimisation to determine a good match between the second and first versions of the received signal's auto-covariance matrix.

8. Apparatus according to claim 7, wherein the cost function used in said optimisation is the norm of the difference between two vectors, one being a row of said first version and the other being the equivalent row of said second version.

9. A receiver for a telecommunications network, the receiver comprising the apparatus of claim 6.

* * * * *

UNITED STATES PATENT AND TRADEMARK OFFICE
CERTIFICATE OF CORRECTION

| | | |
|---|---|---|
| PATENT NO. | : 8,095,077 B2 | |
| APPLICATION NO. | : 12/366035 | |
| DATED | : January 10, 2012 | |
| INVENTOR(S) | : Chappaz | |

It is certified that error appears in the above-identified patent and that said Letters Patent is hereby corrected as shown below:

In Column 3, Line 23, delete "$y_1$" and insert -- $y_i$ --, therefor.

In Column 4, Line 66, delete ""$R_i$"" and insert -- "$R_i$." --, therefor.

In Column 5, Line 3, delete "$\sigma_{i,1}$" and insert -- $\sigma^2_{i,1}$ --, therefor.

In Column 6, Line 14, delete "$a_{ij}$ and $b_{ij}$." and insert -- $a_{i,j}$ and $b_{i,j}$. --, therefor.

In Column 6, Line 54, delete "$|a_2|^2$" and insert -- $|a_2-b_2|^2$ --, therefor.

Signed and Sealed this
Fourth Day of September, 2012

David J. Kappos
*Director of the United States Patent and Trademark Office*